(12) United States Patent
Denkewicz, Jr. et al.

(10) Patent No.: US 7,794,608 B2
(45) Date of Patent: Sep. 14, 2010

(54) APPARATUS AND METHOD FOR TREATING WATER WITH OZONE

(75) Inventors: Raymond P. Denkewicz, Jr., East Greenwich, RI (US); Rolf Engelhard, Prescott, AZ (US)

(73) Assignee: Zuvo Water, LLC, Mountain View, CA (US)

( * ) Notice: Subject to any disclaimer, the term of this patent is extended or adjusted under 35 U.S.C. 154(b) by 295 days.

(21) Appl. No.: 11/770,580

(22) Filed: Jun. 28, 2007
(Under 37 CFR 1.47)

(65) Prior Publication Data
US 2009/0001029 A1      Jan. 1, 2009

Related U.S. Application Data

(60) Provisional application No. 60/806,335, filed on Jun. 30, 2006.

(51) Int. Cl.
*C02F 1/78* (2006.01)
*C02F 1/46* (2006.01)

(52) U.S. Cl. ............ 210/760; 210/748.01; 210/748.08; 210/748.19

(58) Field of Classification Search .............. 210/748, 210/760, 764, 192; 422/29, 24, 186.12
See application file for complete search history.

(56) References Cited

U.S. PATENT DOCUMENTS

| | | | |
|---|---|---|---|
| 2,970,821 A | 2/1961 | Axt | 261/16 |
| 3,336,099 A | 8/1967 | Czulak et al. | 21/102 |
| 3,550,782 A | 12/1970 | Veloz | 210/192 |
| 3,696,932 A | 10/1972 | Rosenberg | 210/437 |
| 3,726,404 A | 4/1973 | Troglione | 210/139 |
| 4,069,153 A | 1/1978 | Gunther | 210/64 |
| 4,141,830 A * | 2/1979 | Last | 210/748 |
| 4,176,061 A | 11/1979 | Stopka | 210/63 Z |
| 4,179,616 A | 12/1979 | Coviello et al. | 250/527 |
| 4,230,571 A * | 10/1980 | Dadd | 210/760 |

(Continued)

FOREIGN PATENT DOCUMENTS

DE       3828026 A1      8/1988

(Continued)

OTHER PUBLICATIONS

Article entitled, "Fountainhead Technologies Talks About Their Unique Approach to Catalytic Water Purification", The Catalyst Review, Nov. 1994, pp. 1, 7-9.

*Primary Examiner*—Walter D Griffin
*Assistant Examiner*—Cameron J Allen
(74) *Attorney, Agent, or Firm*—Pillsbury Winthrop Shaw Pittman LLP

(57) ABSTRACT

Water within a water tank is irradiated with ultraviolet light from a UV lamp for virucidal and germicidal purposes while simultaneously transforming oxygen molecules to ozone molecules in an oxygen containing gas flowing within an annular space defined by a sleeve surrounding the UV lamp. The ozone enriched gas flows into an enlarged chamber into which the UV lamp extends and the flow rate is reduced to enhance the time of exposure of the ozone enriched gas to UV radiation and thereby enhance the production of ozone. To increase the rate of transformation of oxygen molecules to ozone molecules, the gas is under a predetermined pressure prior to entering the annular space and subsequent to discharge from the chamber.

21 Claims, 5 Drawing Sheets

U.S. PATENT DOCUMENTS

| | | | |
|---|---|---|---|
| 4,273,660 A | 6/1981 | Beitzel | 210/760 |
| 4,274,970 A | 6/1981 | Beitzel | 210/748 |
| 4,323,810 A | 4/1982 | Horstmann | 313/24 |
| 4,422,450 A | 12/1983 | Rusteberg | 128/62 A |
| 4,437,999 A | 3/1984 | Mayne | 210/748 |
| 4,694,179 A | 9/1987 | Lew et al. | 250/431 |
| 4,752,401 A | 6/1988 | Bodenstein | 210/746 |
| 4,857,204 A | 8/1989 | Joklik | 210/695 |
| 4,892,712 A | 1/1990 | Robertson et al. | 422/186 |
| 4,913,827 A | 4/1990 | Nebel | 210/748 |
| 4,968,437 A | 11/1990 | Noll et al. | 210/748 |
| 5,043,079 A | 8/1991 | Hallett | 1/32 |
| 5,082,558 A | 1/1992 | Burris | 210/167 |
| 5,106,495 A | 4/1992 | Hughes | 210/139 |
| 5,106,501 A | 4/1992 | Yang et al. | 210/266 |
| 5,120,450 A | 6/1992 | Stanley, Jr. | 210/748 |
| 5,141,636 A | 8/1992 | Flanagan et al. | 210/209 |
| 5,158,454 A | 10/1992 | Viebahn et al. | 433/82 |
| 5,169,606 A | 12/1992 | Batchelor | 422/186.19 |
| 5,178,755 A | 1/1993 | LaCrosse | 210/195 |
| 5,178,758 A | 1/1993 | Hwang | 210/256 |
| 5,180,499 A | 1/1993 | Hinson et al. | 210/706 |
| 5,207,993 A | 5/1993 | Burris | 422/256 |
| 5,213,773 A | 5/1993 | Burris | 422/256 |
| 5,230,792 A | 7/1993 | Sauska | 1/32 |
| 5,266,215 A | 11/1993 | Engelhard | 210/748 |
| 5,268,104 A | 12/1993 | Masoomain | 210/638 |
| 5,302,298 A | 4/1994 | Leitzke | 210/748 |
| 5,352,369 A | 10/1994 | Heinig, Jr. | 210/760 |
| 5,431,861 A | 7/1995 | Nagahiro et al. | 261/140.1 |
| 5,520,893 A | 5/1996 | Kasting, Jr. et al. | 422/305 |
| 5,540,848 A | 7/1996 | Engelhard | 210/748 |
| 5,547,590 A | 8/1996 | Szabo | 210/748 |
| 5,709,799 A | 1/1998 | Engelhard | 210/748 |
| 5,935,431 A | 8/1999 | Korin | 210/205 |
| 5,942,125 A | 8/1999 | Engelhard et al. | 210/748 |
| 6,267,895 B1 | 7/2001 | Engelhard et al. | 210/748 |
| 6,461,520 B1 | 10/2002 | Engelhard et al. | 210/748 |
| 6,491,879 B2 | 12/2002 | Conrad | 422/186.18 |
| 6,511,594 B2 | 1/2003 | Shaw | 210/120 |
| 6,511,638 B2 | 1/2003 | Matsuzaki | 422/186.18 |

FOREIGN PATENT DOCUMENTS

| | | | |
|---|---|---|---|
| EP | 0 235 315 | 2/1986 | |
| EP | 0 237 793 | 2/1987 | |
| EP | 0 227 266 | 7/1987 | |
| EP | 0 316 687 | 5/1989 | |
| JP | 3-143586 A | 6/1991 | |
| JP | 4-141296 A | 5/1992 | |
| WO | PCT/US94/3689 | 11/1994 | 1/32 |
| WO | PCT/US99/13591 | 12/1999 | 2/8 |
| WO | PCT/US00/13839 | 11/2000 | 35/6 |
| WO | WO 2004033376 A1 * | 4/2004 | |

* cited by examiner

APPARATUS AND METHOD FOR TREATING WATER WITH OZONE

CROSS REFERENCE TO RELATED APPLICATIONS

The present application is related to and claims priority from a provisional patent application entitled "APPARATUS AND METHOD FOR TREATING WATER WITH OZONE AND UV RADIATION" filed Jun. 30, 2006 and assigned Ser. No. 60/806,335 and to a disclosing an invention by the present inventors.

BACKGROUND OF THE INVENTION

1. Field of the Invention

The present invention relates to apparatus and methodology for irradiating water with ultraviolet light and simultaneously generating ozone for subsequent entrainment in the irradiated water.

2. Description of Related Prior Art

It is well known to use UV having a wavelength in the range of 254 nanometers (nm) to provide germicidal and virucidal effects on water. Moreover, it is well known that ultraviolet radiation having a wavelength of approximately 185 nanometers radiated through air will cause transformation of a percentage of the oxygen molecules present into ozone molecules. These ozone molecules are effective in oxidizing organic matter. Water subjected to radiation from an ultraviolet lamp (UV lamp) of this type will become purified to a degree sufficient for most purposes. To remove particulate matter that may be present or result from UV radiation, a filter may be employed.

Apparatus embodying the above concepts have been manufactured and sold by the present Assignee. This apparatus includes a sleeve of UV transmissive material, such as quartz, extending along and surrounding a UV lamp. A chamber surrounding the sleeve is filled with water to subject the water to irradiation from the UV lamp through the quartz sleeve. Air is channeled through the annular space between the lamp and the quartz sleeve to subject the air to irradiation from the UV lamp. Some of the oxygen molecules in the air passing through the annular space will be converted to ozone molecules. The ozone enriched air exiting from the annular space is introduced to the water by a sparger, venturi, or the like to entrain the ozone molecules within the water. Necessarily, the flow rate of water through the water chamber is a function of the dosage of the UV radiation and the degree of germicidal and virucidal effect sought. Additionally, the flow rate of water is a function of the density of ozone molecules per unit of water to achieve the sought oxidizing effect on organic matter that may be present.

SUMMARY OF THE INVENTION

The present invention is directed to apparatus for enhancing the production of ozone molecules per unit of air or oxygen containing gas independent of the length of the UV lamp for water irradiation purposes. In particular, the UV lamp is disposed within a UV transparent sleeve coincident with the chamber containing the water to be irradiated. A further chamber receives the remaining length of the UV lamp to accommodate irradiation of a slower flowing larger volume of air to generate ozone molecules. The resulting ozone enriched air is injected into the water to obtain the benefit of oxidation of organic matter that may be present. To further enhance the ozone production, an oxygen enriched gas or even oxygen instead of air may be conveyed past the UV lamp.

It is therefore a primary object of the present invention to provide a water purifying apparatus having a first chamber for irradiating with ultraviolet light the water to be purified while simultaneously producing a quantity of ozone and a second chamber providing a significant volume of a gas containing oxygen surrounding the UV lamp to enhance production of ozone.

Another object of the present invention is to provide a water purification apparatus which incorporates a small sized sleeve enveloping a UV lamp and a significantly larger chamber for subjecting an oxygen containing gas to ultraviolet light and production of ozone molecules.

Still another object of the present invention is to provide a water purifier incorporating an ozone generator having a high flow rate of oxygen containing gas past a UV lamp in a water tank and a chamber having a relatively slow moving oxygen containing gas past the UV lamp to enhance production of ozone while maintaining the capability of irradiating water in a water tank.

Still another object of the present invention is to provide a dual chamber apparatus for purifying water wherein the water in one chamber is primarily irradiated with ultraviolet light and an oxygen containing gas is irradiated with ultraviolet light to produce ozone molecules in the other chamber.

A further object of the present invention is to provide a low cost water purifier for both irradiating the water with ultraviolet light and for producing ozone to be entrained in the water.

A yet further object of the present invention is to provide a method for irradiating and ozonating water to be purified by irradiating the water in one chamber and primarily generating the ozone in another chamber.

A yet further object of the present invention is to provide a tank of any select size coupled to a chamber for radiating water to be purified with ultraviolet light and transforming oxygen molecules to ozone molecules in response to irradiation by ultraviolet light, respectively.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which.

DESCRIPTION OF THE PREFERRED EMBODIMENT

Figure 1:
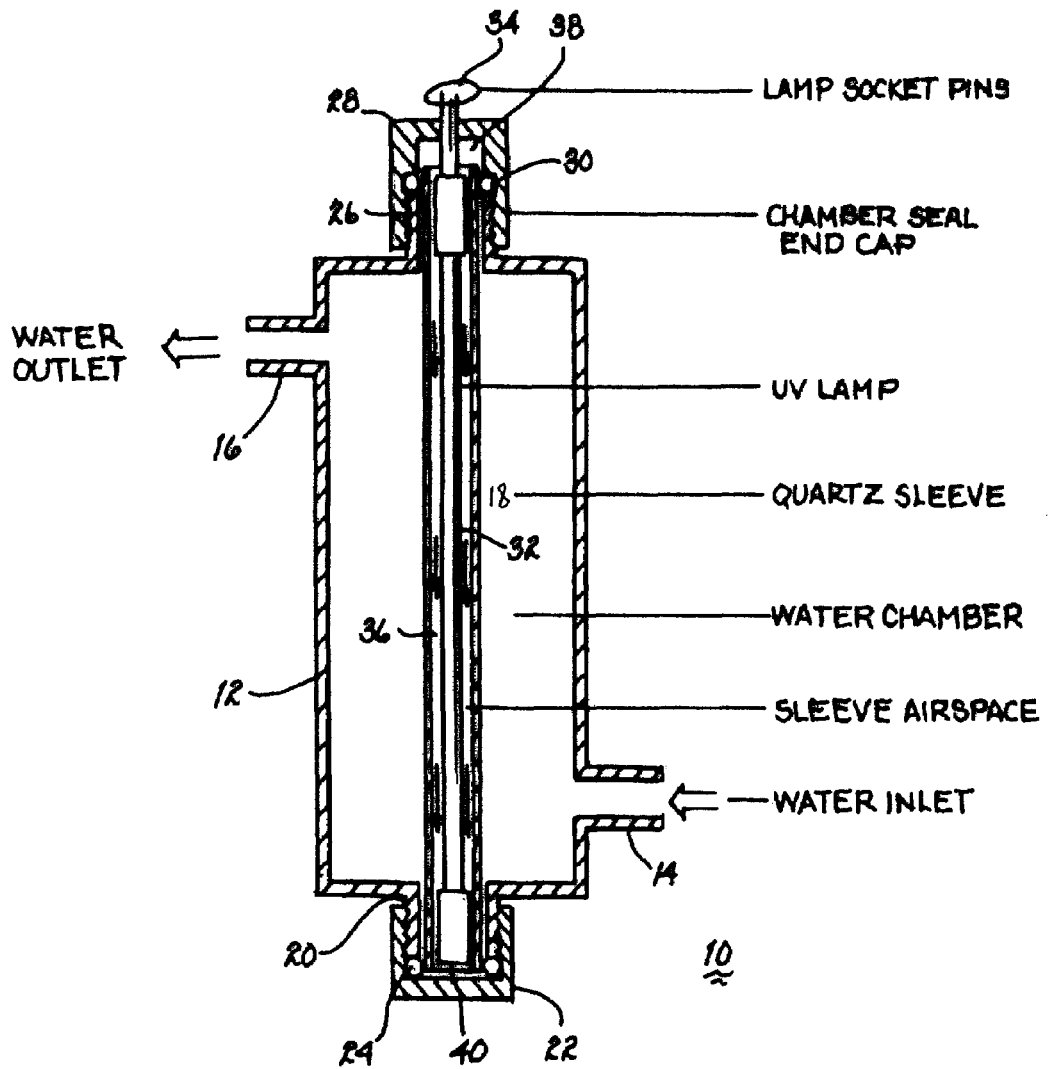
FIG. 1 is an illustration of prior art apparatus for purifying water with ozone and ultraviolet radiation.

FIG. 1 illustrates a prior art water purification apparatus 10 for purifying water with ultraviolet (UV) radiation and ozone. The apparatus includes a canister 12 or other vessel for receiving water through inlet 14 and discharging the irradiated water through outlet 16. A sleeve 18 extends through canister 12 and is of UV transmissive material, such as quartz. A boss 20 extends from the bottom of the canister to receive and house the lower end of sleeve 18. This boss includes threads for threaded engagement with a cap 22. An O-ring 24 or the like provides a seal to prevent outflow of water. Similarly, a boss 26 extends from the top of canister 12. A further cap 28 threaddedly engages boss 26, as illustrated. An O-ring 30 or the like prevents outflow of water intermediate sleeve 18 and boss 26. An ultraviolet lamp 32 (UV lamp) is disposed within sleeve 18 and may extend from boss 26 to boss 20. Electrical conductors 34 extend from cap 28 and provide electric power to the UV lamp. An annular space 36 is disposed intermediate UV lamp 32 and sleeve 18.

In operation, water flows into canister 12 through inlet 14 and about sleeve 18 and is exhausted through outlet 16. Simultaneously, UV lamp 32 is energized to radiate ultraviolet light having a wavelength of about 254 nanometers (nm), sometimes referred to as UV254. Radiation at this wavelength provides a virucidal and germicidal effect on microorganisms that may be in the water and become irradiated.

It is well known that oxygen molecules in an oxygen containing gas, such as air, are transformed into ozone molecules in response to irradiation of ultraviolet light having a wavelength of 185 nanometers (nm), sometimes referred to as UV185. Air or other oxygen containing gas is introduced under ambient or elevated pressure to space 38 within cap 28. This gas flows downwardly therefrom through annular space 36 to a further space 40 within cap 22. The oxygen containing gas flowing through annular space 36 is irradiated with UV185 and certain of the oxygen molecules therein are converted to ozone molecules. The ozone enriched gas in space 40 defined by cap 22 may be introduced to the water in canister 12 (not shown). Upon such introduction, the ozone will have an effect of oxidizing organic matter with which it comes in contact. Any excess ozone may be vented or otherwise eliminated from the water to prevent the purified water from having an unpalatable taste in the event the water is intended to be used as portable water. Other uses may also dictate the removal of any ozone molecules.

One of the problems with apparatus 10 shown in FIG. 1 is that annular space 36 must necessarily be of small inner and outer diameter for both practical and functional reasons. First, a very large diameter quartz sleeve is very expensive. Second, a large diameter quartz sleeve is relatively fragile and may break in response to the pressure of the water within canister 12. To compensate to a greater or lesser extent for the pressure differential across the wall of the quartz sleeve, the gas passing therewithin may be under pressure; however, any disruption of the gas flow may increase the pressure differential with attendant risk to the quartz sleeve. Third, during initiating and termination of operation of apparatus 10, there may be pressure differential spikes acting on the sleeve which may compromise the integrity of the sleeve. Fourth, if the annular space is excessive, the water will not draw sufficient heat from the air in the annular space and the lamp may become too hot and affect the relative ratio of UV254 to UV185.

The amount of ozone molecules created in response to irradiation with UV185 is a function of the time of exposure of the oxygen molecule containing gas to irradiation by UV185. Because practical considerations dictate that sleeve 18 be relatively small with a commensurate narrow annular space 36, air flow therethrough must be relatively rapid to obtain a sufficient volume of oxygen containing gas for irradiation purposes. The rapid transit time of the oxygen bearing gas will have a negative effect upon the amount of ozone molecules produced. Thus, the construction of apparatus 10 is necessarily a compromise between the cost of sleeve 18 and the greater production of ozone molecules.

Figure 2:
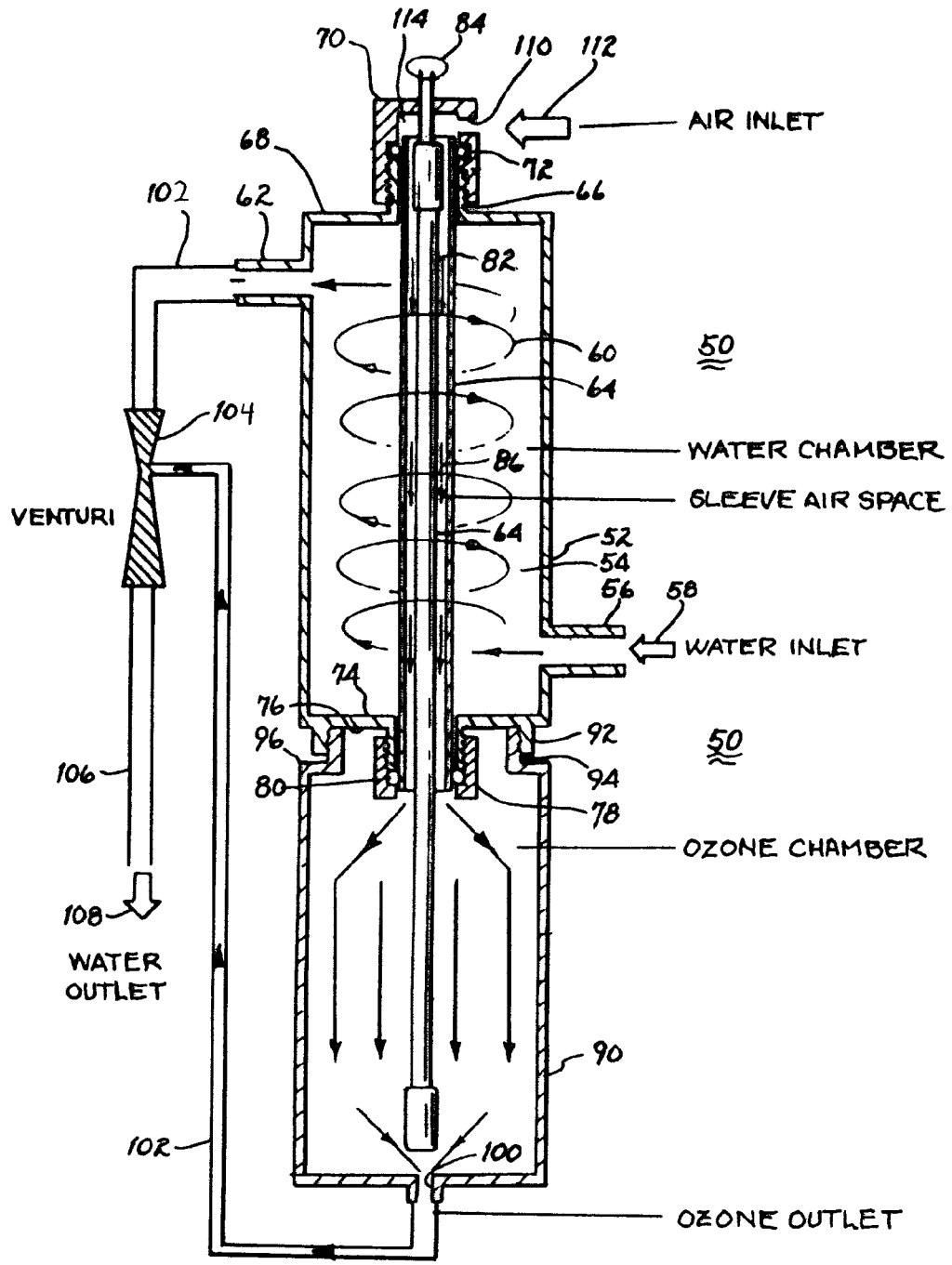
FIG. 2 illustrates the modular construction of the present invention and introduction of ozone into post irradiated water.

Referring to FIG. 2 there is illustrated a water purifier 50 that provides UV radiation (UV254) of water for virucidal and germicidal purposes and exposure of an oxygen containing gas to UV radiation for a significant period of time to enhance production of ozone molecules. A tank 52 receives water 54 through inlet 56, as depicted by arrow 58. Preferably, the water will swirl within tank 52 as depicted by arrows 60. The water is discharged through outlet 62. A sleeve 64 of quartz or other ultraviolet transmissive material extends from within a boss 66 at top 68 of tank 52. A threaded cap 70 is engaged with boss 66 which, when tightened, compresses an O-ring 72 to form a seal against sleeve 64 to prevent water leakage alongside the sleeve. Similarly, a boss 74 extends from bottom 76 of tank 52. A cap 78 is in threaded engagement with boss 74 and, upon tightening the cap, will compress an O-ring 80 against sleeve 64 to prevent water leakage adjacent the sleeve. A UV lamp 82 is mounted proximate the upper end of sleeve 64 with suitable retaining members to retain the UV lamp in place. Electrical conductors 84 may extend through cap 70 to interconnect the UV lamp with a suitable source of electrical power. The inner diameter of sleeve 64 is greater than the diameter of UV lamp 82 extending therethrough to provide an annular space 86 therebetween.

UV lamp 82 extends downwardly from the terminal end of sleeve 64 into a chamber 90. The lower end of the UV lamp may be mounted in a fixture (not shown) in the chamber or be unsupported, as illustrated, as a function of the expected stresses that may be imposed on the UV lamp. Chamber 90 may be removably attached to tank 52. For example, a threaded annular wall 92 may extend from bottom 76 of tank 52 for threaded engagement with a neck 94 extending from top 96 of chamber 90.

Chamber 90 includes an outlet 100 in fluid communication with a conduit 102. Water outlet 62 is in fluid communication with a conduit 104 extending therefrom and connected to the inlet of a venturi 106. Thereby, the water outflowing through outlet 62 is passed through the venturi into a further conduit 108 to the ultimate user, represented by arrow 108. Conduit 102 interconnects with venturi 106. As is well known, as water flows through the venturi in the restricted area, the pressure will drop. Such pressure drop will cause a pressure differential between the interior of conduit 102 and the interior of the venturi and flow through conduit 102 into the venturi will occur. Thus, the ozone gas emanating from conduit 102 will become mixed with or entrained with the water flowing through the venturi.

Cap 70 includes an inlet 110 for drawing an oxygen containing gas or receiving the oxygen containing gas under ambient or elevated pressure, as represented by arrow 112. The air flowing into space 114 within cap 70 flows downwardly through annular space 86 between UV lamp 82 and the interior of sleeve 64. Preferably, the UV lamp emits radiation at a wavelength of 185 nanometers (nm) which is known to have the effect of transforming oxygen molecules to ozone molecules. Thus, the air flowing through annular space 86 will be enriched by ozone molecules. Additionally, the UV lamp emits radiation of a wavelength of 254 nanometers (nm) which wavelength is known to have virucidal and germicidal effects. As sleeve 64 is transmissive to ultraviolet radiation, the radiation will penetrate into the water flowing in tank 52 and swirling about sleeve 64. The effect of such irradiation will be that of destroying microorganisms.

The ozone molecule enriched oxygen containing gas flows downwardly through annular space 86 into chamber 90. As illustrated, the chamber is relatively large and the airflow therethrough is relatively slow compared to the airflow rate through annular space 86. The slower moving gas will permit additional time for irradiation by the UV lamp and thereby enhance the rate of generation of ozone molecules. The ozone molecule enriched gas is discharged through outlet 100 into conduit 102. Thereafter, the ozone enriched gas is entrained within the water flowing through venturi 106. The effect of such entrainment is that of oxidizing organic matter that may be present in the water.

By employing a chamber 90, the production of ozone molecules is significantly enhanced over that produced within annular space 86 in tank 52. Thus, the oxidative effect and hence destruction of organic matter in the water provided to the end user through conduit 106 is significantly enhanced.

Figure 3:
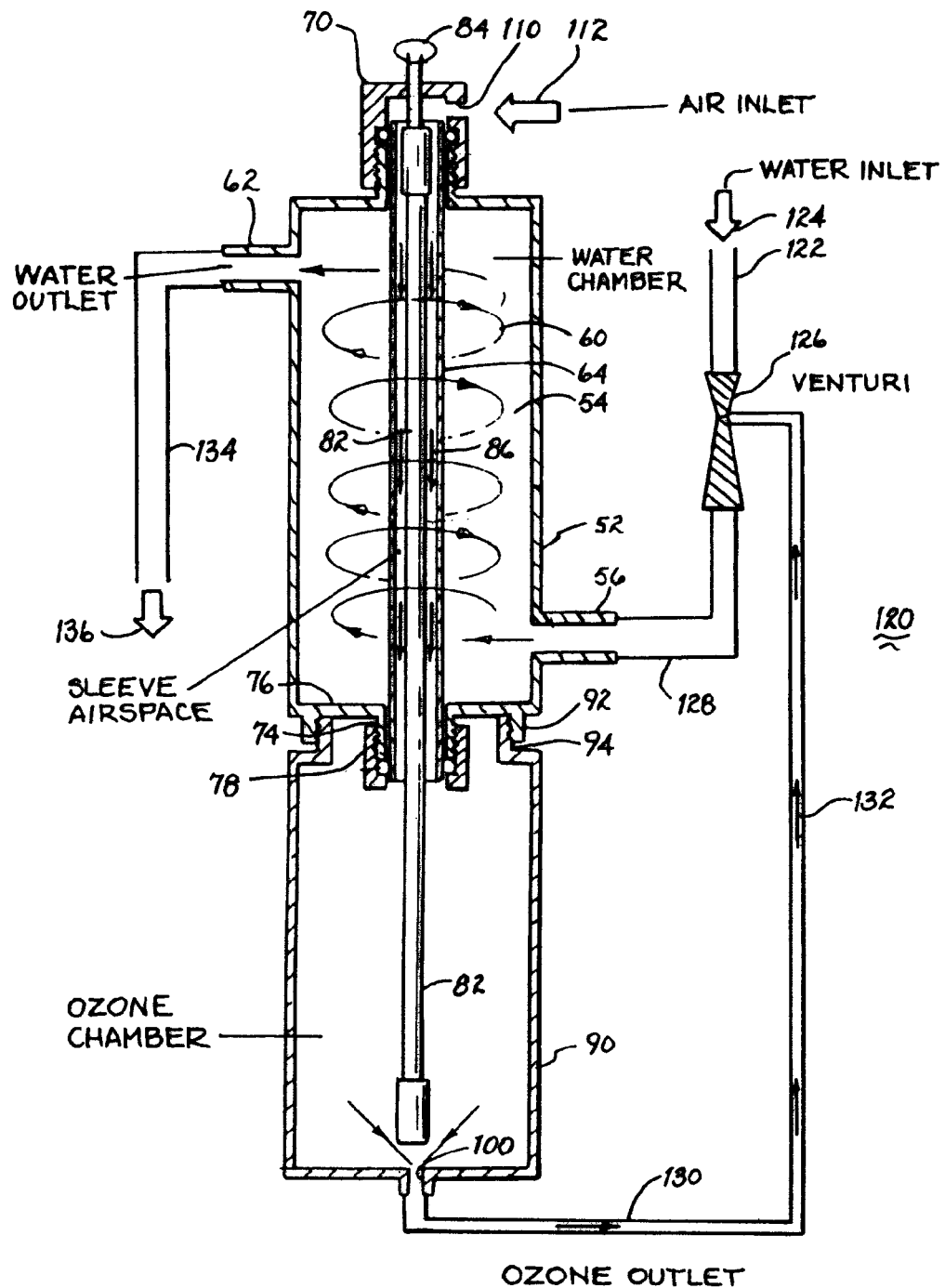
FIG. 3 illustrates the introduction of ozone into pre irradiated water.

Referring to FIG. 3, there is shown a variant water purifier 120. The construction and operation of tank 52 and chamber 90 described above with respect to water purifier 50 are the same as the tank and chamber shown with respect to water purifier 120. Accordingly, only the differences between the two water purifiers will be discussed in detail.

Water to be purified is introduced to conduit 122, as represented by arrow 124. The inflowing water flows through a venturi 126 and into a conduit 128 in fluid communication with inlet 56. The ozone enriched gas discharged through outlet 100 in chamber 90 flows through a conduit 130, as depicted by arrows 132 into venturi 126. As discussed above, the ozone enriched gas is introduced to the venturi at its necked down section which is at a lower pressure than the pressure within conduit 132. Thereby, the ozone enriched gas will become entrained within the water flowing through the venturi. The introduction of ozone molecules into the water will have an oxidative effect upon organic matter that may be present. As a result of the inflowing ozone enriched water within tank 52 and its swirling action about sleeve 64, as represented by arrow 60, entrainment of ozone molecules will be relatively uniform. Simultaneously, irradiation of the water by lamp 82 radiating UV254 will have a virucidal and germicidal effect on microorganisms that may be present within the water. The purified water is discharged through outlet 62 and into a conduit 134 to an ultimate user, as represented by arrow 136.

Figure 4:
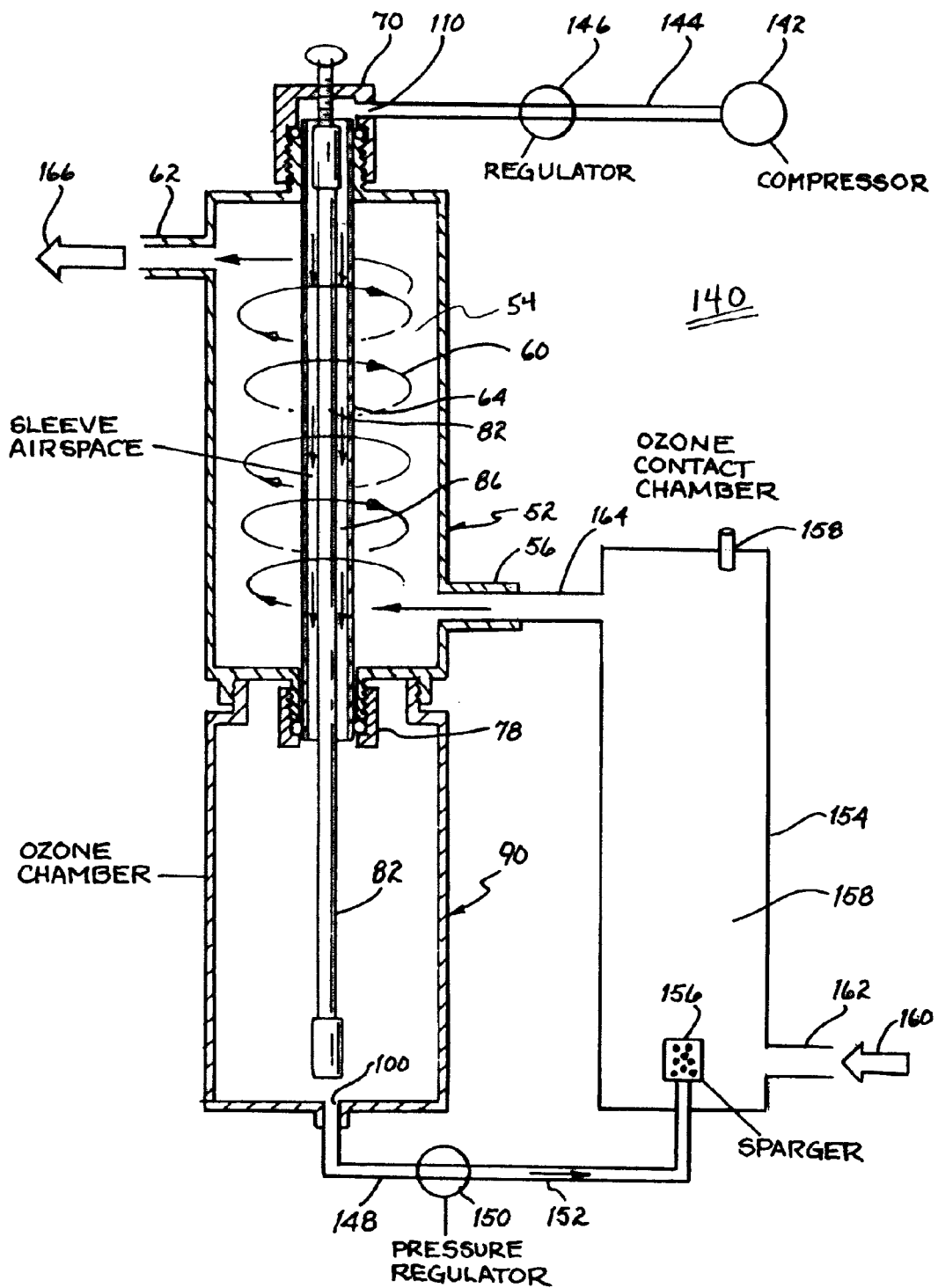
FIG. 4 illustrates a variant of the apparatus shown in FIG. 3 for introducing ozone into water to be purified.

In conclusion, water purifier 120 introduces an ozone enriched gas to the water inflowing to tank 52. Therein, the water is irradiated to attempt to destroy any microorganisms that may be present and simultaneously organic matter that may be present becomes oxidized by the ozone molecules. The resulting purified water is thereafter discharged. A yet further variant 140 is shown in FIG. 4, which variant is based upon water purifier 50 shown in FIG. 2. The common elements and operation will not be described in detail for purposes of brevity.

A gas containing oxygen molecules, such as air or oxygen, is compressed by compressor 142 and is conveyed through conduit 144 via a pressure regulator to inlet 110 in cap 70. It is known that the production of ozone molecules from oxygen molecules under the influence of ultraviolet radiation having a wavelength of 185 nanometers (nm) will be enhanced if the oxygen containing gas is under pressure. The purpose of compressor 142 is that of placing the oxygen containing gas under pressure. The purpose of regulator 146 is to regulate the pressure of the oxygen containing gas actually flowing into annular space 86 between UV lamp 82 and sleeve 84. As discussed above, sleeve 84, usually being made of quartz, is relatively fragile. If the pressure differential across the sleeve due to pressure variations between the gas flowing in annular space 86 and water 54 within tank 52 is more than nominal, breakage of the sleeve may occur. By placing the oxygen containing gas under pressure essentially commensurate with the pressure exerted by water 54 in tank 52, the pressure differential is, at most, nominal and well within the strength parameters of sleeve 64.

The oxygen containing gas under pressure is conveyed from annular space 86 into chamber 90, as discussed above. Within this chamber, production of ozone molecules is enhanced because the oxygen containing gas therein is under pressure and because the oxygen containing gas flows more slowly than in annular space 86. The oxygen containing gas with a population of ozone molecules is discharged from chamber 90 through outlet 100 and into conduit 148. A pressure regulator 150 is in line with conduit 148 to insure maintenance of pressure of the oxygen containing gas and ozone molecules flowing through annular space 86 and chamber 90 of variant 140. From the pressure regulator, the oxygen containing gas with ozone molecules flows through a further conduit 152 into a water tank 154. The ozonated gas is discharged within the water through a sparger 156 or the like to discharge bubbles that are relatively easily entrained within water 158 in water tank 154. As illustrated, the water to be purified flows from a source, represented by arrow 160, through inlet 162. The bubbles discharged from sparger 156 will become entrained within water 158 flowing through tank 54 and discharged through conduit 164 into inlet 56 of tank 52. A vent 158 or other means for evacuating excess ozone gas may be incorporated with tank 52.

The ozone molecules entrained within water 158 will have a tendency to oxidize organic matter that may be present in the water. The swirling action of the water within tank 52, as represented by arrow 60, tend to enhance mixing of the entrained ozone molecules in the water and promote oxidization of organic matter. Simultaneously, radiation from the UV lamp at a wavelength of 254 nanometers (nm) will penetrate the water to a certain degree and cause a virucidal and germicidal effect on any microorganisms that may be present. The swirling action of the water within tank 54 will enhance exposure of the water to the UV radiation and thereby enhance complete destruction of any microorganisms that may be present. The ozonated and irradiated water is discharged through outlet 62 to an end user, as presented by arrow 166.

Figure 5:
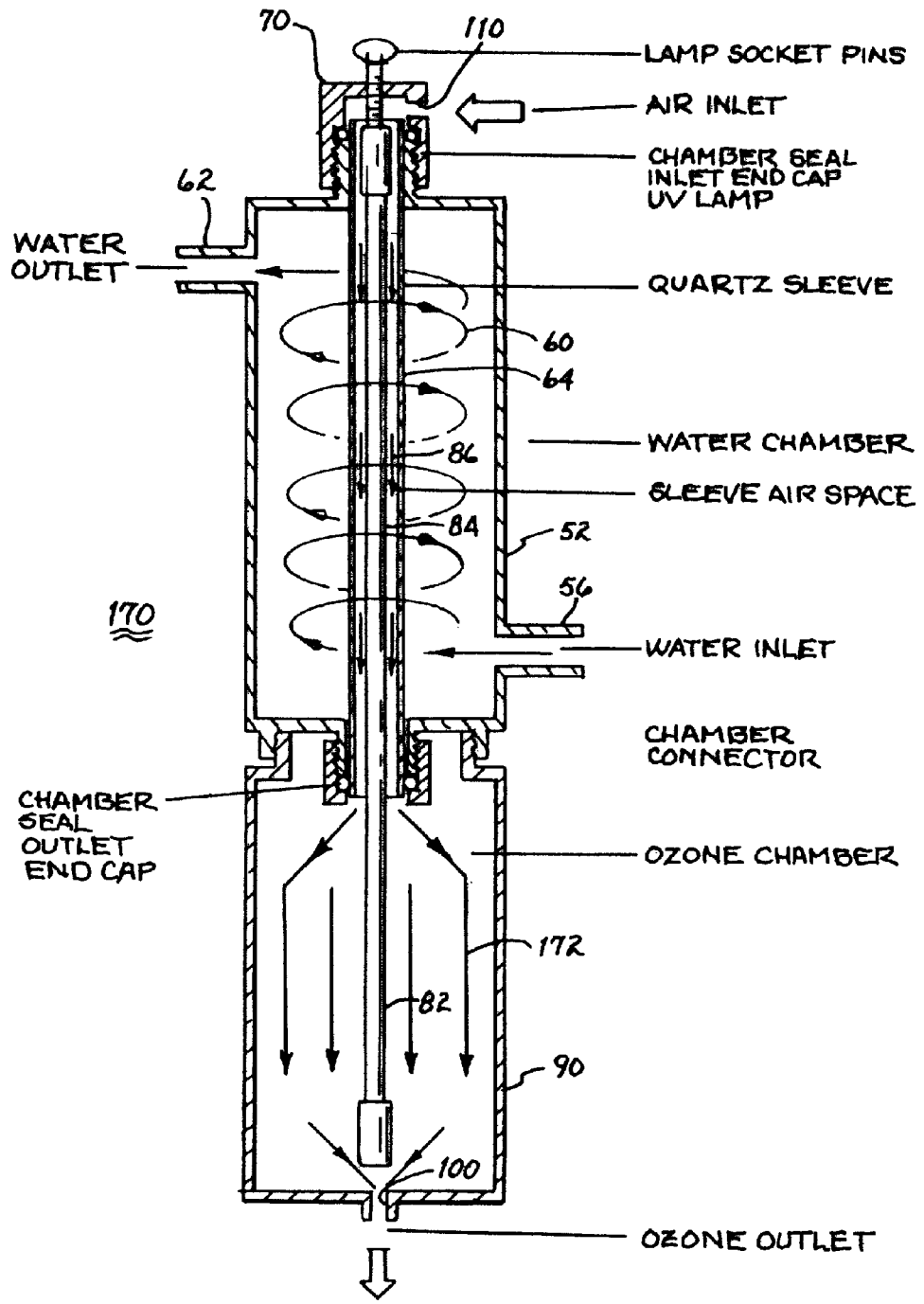
FIG. 5 illustrates a generic form of the present invention.

FIG. 5 is equivalent to the representations of water purifier 50, first variant 120 and second variant 140 except that the uses of the ozone molecule enriched oxygen containing gas are absent. That is, embodiment 170 primarily illustrates the generation of ozone molecules from an oxygen containing gas. Furthermore, it illustrates by arrows 172 the expansion and significant volume increase of the oxygen containing gas flowing around and about UV lamp 82 to enhance production of ozone molecules. The ozone enriched gas is discharged through outlet 100 and may be used for purposes separate and apart from the water purifier represented by embodiment 170. Alternatively, the ozone molecule enriched gas may be injected into the water prior to irradiation by UV lamp 82 or subsequent to such irradiation through any of numerous possible paths.

In an embodiment built and tested of the configuration shown in FIG. 5, which configuration is the foundation for the versions shown in FIGS. 2, 3 and 4, the following parameters were present. The water purifier was thirty inches (30") long and six inches (6") in diameter. Water tank 52 was twenty-four inches (24") long and chamber 90 approximately six inches (6") long. The UV lamp extended within a sleeve 64 having an inner diameter of 2.15 centimeters surrounding the UV lamp which had a diameter of 1.5 centimeters. Accordingly, the width of the annular space 86 was approximately 0.65 centimeters. The UV lamp power rating was 80 Watts.

Room temperature (75° F.) air was introduced to inlet 110 at the rate of 60 cubic feet per hour under a one atmosphere total pressure. The air flowed through the annular space between the sleeve and the UV lamp and through chamber 90. During this passage of air, it was subjected to UV radiation having a wavelength of 185 nanometers (nm). Upon testing the ozone molecule enriched air exiting through outlet 100, the ozone concentration was measured and found to be 320 ppmv.

We claim:

1. Apparatus for purifying water, said apparatus comprising in combination:
    a) a water tank having a water inlet and a water outlet;
    b) a UV lamp disposed within said tank for irradiating the water with ultraviolet light;
    c) a sleeve surrounding said UV lamp for creating an annular space between said UV lamp and said sleeve;
    d) a chamber in fluid communication with the annular space, said chamber including an outlet;
    e) a source of oxygen containing gas;
    f) a gas inlet for conveying the gas into said sleeve for irradiation by said UV lamp to convert oxygen molecules in the gas to ozone molecules;
    g) a gas outlet for discharging the ozone enriched gas from the annular space into said chamber;
    h) said chamber having a significantly increased cross sectional area between said gas outlet of the annular space and the outlet of said chamber to reduce the flow rate of ozone enriched gas within said chamber, said chamber further having a substantially larger volume than the annular space, wherein the flow of the gas from the gas outlet to the outlet of the chamber takes substantially longer than the flow of the gas from the gas inlet to the gas outlet; and
    i) a UV lamp disposed within said chamber for converting oxygen molecules in the ozone enriched gas to ozone molecules.

2. The apparatus for purifying water as set forth in claim 1, including a conduit for conveying the ozone enriched gas from said chamber into the water in said tank.

3. The apparatus for purifying water as set forth in claim 1 wherein a common UV lamp extends from within said sleeve into said chamber.

4. The apparatus for purifying water as set forth in claim 2, including a venturi disposed in fluid communication with said water inlet and said conduit conveying ozone enriched gas for entraining the ozone enriched gas in the water flowing into said tank.

5. The apparatus for purifying water as set forth in claim 4 wherein a common UV lamp extends from within said sleeve into said chamber.

6. The apparatus for purifying water as set forth in claim 2, including a venturi disposed in fluid communication with said water outlet and said conduit conveying ozone enriched gas for entraining the ozone enriched gas in the water flowing from said tank.

7. The apparatus for purifying water as set forth in claim 6 wherein a common UV lamp extends from within said sleeve into said chamber.

8. The apparatus for purifying water as set forth in claim 1, including a further tank for receiving water to be purified, said further tank including a conduit in fluid communication with said water inlet for conveying water to said tank and wherein said conduit conveying the ozone enriched gas in fluid communication with said further tank and including a device for entraining the ozone enriched gas in the water in said further tank.

9. The apparatus for purifying water as set forth in claim 8 wherein said device is a sparger.

10. The apparatus for purifying water as set forth in claim 9 wherein a common UV lamp extends from within said sleeve into said chamber.

11. The apparatus for purifying water as set forth in claim 1 wherein the oxygen containing gas is air.

12. The apparatus for purifying water as set forth in claim 1, including a pressure regulator disposed upstream of said gas inlet and a further pressure regulator disposed downstream of said chamber for maintaining the oxygen containing gas under pressure during exposure to said UV lamp.

13. A method for purifying water, said method comprising the steps of:
    a) irradiating water within a tank with ultraviolet light from a UV lamp disposed in the tank;
    b) producing ozone molecules from an oxygen containing gas flowing through an annular space between the UV lamp and a surrounding sleeve and creating an ozone enriched gas;
    c) conveying the ozone enriched gas to a chamber having greater cross sectional area than the annular space to reduce the flow rate of the ozone enriched gas through the chamber, wherein the flow of the gas through the chamber takes substantially longer than the flow of the gas through the annular sleeve; and
    d) subjecting the ozone enriched gas in the chamber to ultraviolet radiation from a UV lamp to produce a higher concentration of ozone molecules in the gas; and
    e) discharging the ozone enriched gas from the chamber.

14. The method for purifying water as set forth in claim 13, further including the step of entraining the ozone enriched gas in the water to be purified.

15. The method for purifying water as set forth in claim 13 wherein said step of entraining includes the step of entraining the ozone enriched gas in the water flowing into the tank.

16. The method for purifying water as set forth in claim 15 wherein said step of entraining is effected with a venturi.

17. The method for purifying water as set forth in claim 14 wherein said step of entraining includes the step of entraining the ozone enriched gas in water flowing out of the tank.

18. The method for purifying water as set forth in claim 17 wherein said step of entraining is effected by a venturi.

19. The method for purifying water as set forth in claim 13, including a further tank in fluid communication with the tank to convey water from the further tank to the tank and including the step of entraining the ozone enriched gas in the water in the further tank.

20. The method for purifying water as set forth in claim 19 wherein said step of entraining is accomplished with a sparger.

21. The method for purifying water as set forth in claim 13, further including the step of maintaining the gas under a predetermined pressure between a location upstream of said annular space and a location downstream of said chamber.

* * * * *